United States Patent [19]
Peterman et al.

[11] Patent Number: 5,660,886
[45] Date of Patent: Aug. 26, 1997

[54] METHOD FOR FORMING IN SITU DIFFUSION BARRIER WHILE DIFFUSING ALUMINUM THROUGH NICKEL-BORON

[76] Inventors: Douglas J. Peterman, McDonnell Douglas, Mail Code 1111041, P.O. Box 516; Joan E. Deffeyes, McDonnell Douglas Mail Code 034-1126 P.O. Box 516, both of St. Louis, Mo. 63166; James E. O'Neal, 11961 Majella, Bridgeton, Mo. 63044

[21] Appl. No.: 427,137

[22] Filed: Apr. 24, 1995

[51] Int. Cl.$^6$ ............................................. B05D 3/02
[52] U.S. Cl. ......................... 427/376.6; 427/376.7; 427/376.8; 427/405; 427/419.7
[58] Field of Search ............................ 427/376.6, 376.7, 427/376.8, 414.7, 405

[56] References Cited

U.S. PATENT DOCUMENTS

| | | | |
|---|---|---|---|
| 4,055,706 | 10/1977 | Galmiche et al. | 428/652 |
| 4,933,239 | 6/1990 | Olson et al. | 428/557 |
| 5,049,418 | 9/1991 | Tobin | 427/250 |
| 5,116,670 | 5/1992 | Brindley et al. | 428/614 |
| 5,126,213 | 6/1992 | Restall | 428/660 |

*Primary Examiner*—Benjamin Utech
*Attorney, Agent, or Firm*—Veo Peoples, Jr.; Peoples & Hale

[57] ABSTRACT

An improved protective coating system for metal substrates is described. Nickel-aluminide duplex coatings are improved by adding an effective amount of boron in the nickel coating step and by retaining the boron during the aluminization step. An unexpected result of the retained boron is its non-deleterious effect on oxidation protection. During aluminization, the boron surprisingly migrates to the coating/substrate interface, forming a diffusion barrier in situ. The barrier inhibits both inward diffusion of the nickel-aluminide coating and outward diffusion of substrate impurities. The process enables thinner, less expensive coatings.

7 Claims, 8 Drawing Sheets

METHOD FOR FORMING IN SITU DIFFUSION BARRIER WHILE DIFFUSING ALUMINUM THROUGH NICKEL-BORON

BACKGROUND OF THE INVENTION

1. Field of the Invention

The present invention relates to protective coatings for metal substrates. It relates more particularly, but not exclusively, to oxidation protection for titanium and titanium alloys operating at high temperatures.

2. Background of the Prior Art

Lightweight aerospace structures, including, for example, aircraft engines, gas turbines and associated compressor components, are subjected to repeated thermal cycling between heated operational temperatures and cooler ambient temperatures. Important metals of construction for such structures may be steels, nickel based superalloys, titanium, and titanium alloys, herein referred to as metal substrates. However, excellent balance of strength, ductility, microstructural stability, and oxidation/corrosion resistance inures from low density titanium and titanium alloys, as compared with the competitive materials.

It is well known that such low density materials can improve both the efficiency of gas turbine compressors and the thrust-to-weight ratio of gas turbine engines, such as those used in aircraft. Nevertheless, the affinity of titanium for oxygen poses a serious limitation on the use of titanium and most titanium alloys, in high temperature applications, above about 600° C. That is, oxygen embrittles titanium, causing a reduction in toughness and creep resistance. In addition, there are oxide coatings or scales which form on titanium, but which readily spall at above 600° C.

Efforts to improve the oxidation resistance of metal substrates, especially titanium, have included the addition of alloying components such as chromium (Cr) and aluminum (Al) because such components allow formation of scales which are more protective than the titanium oxide scales. Unfortunately, the use of alloy addition alone provides inadequate oxidation protection and can adversely affect mechanical properties.

An alternative protective system or adjunct to the use of alloy additions is the use of separate and distinct layers of protective coatings applied over the titanium substrate. For example, aluminide coatings are a particularly desirable alternative because of their ability to oxidize into a highly protective $Al_2O_3$ layer.

However, diffusion of aluminum to the underlying metal substrate seriously limits the protective ability of aluminide coatings because the loss of aluminum allows other oxides to form. Furthermore, this diffusion of Al into the substrate is accompanied by the formation of new intermetallic compounds which are deleterious to the mechanical properties of the system. Consequently, a great deal of effort has been focused on providing a means to prevent and/or compensate for the loss of Al. Ni-Cr-Al alloy coatings have been widely employed for protecting nickel and cobalt-based superalloys. One of the chief reasons that Cr is substituted for Al is that it lowers the amount of Al required to form a stable $Al_2O_3$ layer—thus enabling the use of thinner coatings and lowering the amount of Al diffusion into the substrate. A process which, instead of compensating for Al diffusion, serves to prevent the diffusion altogether, would enable the use of even thinner coatings.

Ni-Cr-Al type coatings have been deposited on Ni superalloys, as disclosed by Galmiche, et al. in U.S. Pat. No. 4,055,706 (Oct. 25, 1977). "Duplex" processes were conducted wherein a first precasing of nickel-boron (5% to 7% boron) was deposited on the superalloy, the boron was then removed, and a second casing was deposited by chromoaluminization. Boron was employed, in the first step, to enable the use of a low-cost aqueous coating technique. However, the boron was immediately thereafter eliminated by way of an extra processing step. The high activity of boron (inter alia its affinity for oxygen), unless eliminated, had extremely adverse effects on corrosion resistance. There was some residual boron carbide and boron carbonitride remaining during this chromoaluminization second step, which was said to form a diffusion barrier. However, whatever barrier which formed had little, if any, effect in preventing outward diffusion of cobalt and inward diffusion of Al. In example 1a of the Galmiche patent, a cobalt-based superalloy, coated using this process, resulted in cobalt at the surface (which had thus diffused out through any barrier) and a gradient in aluminum concentration (which had thus diffused in through any barrier).

A more recent development involving Ni-Cr-Al coatings deposited on Ni-based superalloys was disclosed by Olson, et al., in U.S. Pat. No. 4,933,239 (Jun. 12, 1990). Therein, Ni and certain oxygen active materials such as yttrium, silicon and hafnium undercoated the Al-Cr.

In this case, the duplex coating process led to a thick diffusion zone which was said to improve the overall resistance to thermal-mechanical fatigue cracking while retaining an outer layer having the good oxidation resistance of M-Cr-Al-Y type coatings known from prior art (M is Ni or Co). Again, this process did not prevent Al diffusion.

The addition of Y (or Hf) to Ni-Cr-Al type coatings has been found to increase the adherence of the $Al_2O_3$ scale and thus improve oxidation resistance. Scientific evidence suggests that impurities, such as sulfur, which diffuse from the underlying substrate, are scavenged by these reactive-element additions and that these impurities therefore do not reach the scale/aluminide interface where they would otherwise adversely affect scale adherence. In other words, the reactive impurities compensate for the outward diffusion of elements from the substrate. A process which could prevent diffusion of impurities could negate the need for Y.

The drawbacks associated with the high temperature behavior of Ni-Cr-Al or Ni-Cr-Al-Y layers coated on Ni-based superalloys are even more severe when such layers are coated on Ti substrates. Diffusion of Al into Ti is quite rapid, requiring thick coatings and leading to the formation of brittle TiAl intermetallic phases. Furthermore, TiNi intermetallic phases may also form. These intermetallic phases render the coating susceptible to spallation damage.

A. Tobin, in U.S. Pat. No. 5,049,418 (Sep. 17, 1991), coated NiAl on Ti substrates. In order to prevent brittle, degradative intermetallic TiNi and TiAl at the substrate interface, an extraneous layer of Nb and Ta was employed as a diffusion barrier. Furthermore, a special intermediate layer of copper was required in order to bond the diffusion barrier layer to the substrate.

Brindley, et al., in U.S. Pat. No. 5,116,690 (May 20, 1992) claimed that Ni-Cr-Al-Y type oxidation resistant coatings that had worked with superalloys also worked with Ti alloys. However, they did not discuss the limited high temperature lifetime which results from Al diffusion.

J. Restall disclosed in U.S. Pat. No. 5,126,213 (Jun. 30, 1992) abandonment of the duplex Ni-Cr-Al coating processes, when coating Ti substrates. Instead, he applied a singular nickel-chromium based alloy coating where nickel and chromium comprised at least 75% of the coating, allowing for only minor alloy amounts of aluminum, i.e., 2% to 12%. "Minor" proportions of boron were mentioned but not tested, and no benefit in using boron was given.

A duplex coating process which enabled a substantially greater surface content of Al and where a diffusion barrier formed in situ would represent an important advancement over the prior art.

SUMMARY OF THE INVENTION

It is therefore a principal object of the present invention to provide a coating system to protect metal substrates, which system provides an effective barrier to aluminum diffusion into the underlying substrate.

It is a further principal object to provide an improved method for protecting titanium substrates with an Al/Ni+B duplex coating system which negates the need for applying either an additional diffusion barrier or a special bonding layer.

It is a further object of this invention to provide an improved boron-enriched duplex process without having to substantially eliminate the boron prior to aluminization.

It is an additional object of this invention to provide a more effective diffusion barrier for inhibiting the outward diffusion of sulfur and other impurities from the substrate.

It is a still further object of the present invention to provide an in situ boron diffusion barrier without the need to react the boron with an outflow of carbon or nitrogen from the substrate.

These objects and others, which will become more apparent from the Detailed Description and Examples, are made possible by our unexpected discovery that while diffusing aluminum into a nickel boron coating, the boron migrates to the coating/substrate interface to form a highly effective diffusion barrier. High amounts of boron can be employed without adverse effects on oxidation protection. In the case of Ti or Ti alloy substrates, when subjected to high temperature, a $TiB_2$ diffusion barrier forms at the coating/substrate interface, further inhibiting formation of deleterious TiAl and TiNi intermetallic phases.

DETAILED DESCRIPTION AND PREFERRED EMBODIMENTS

In the process of the present invention, a nickel plus boron coating is prepared. The effective amount of boron needed to achieve an in situ diffusion barrier, which amount is admixed in the nickel, may range from 0.01% to 6% by weight depending upon the ultimate thickness of the required NiAl layer. The thickness of the NiAl layer, for oxidation protection applications, is set by the rate of Al loss through oxidation (the formation of $Al_2O_3$) at a particular use temperature. This then sets the amount of Ni required for the desired nickel-to-aluminum ratio of the protective outer coating. The thicker the Ni+B layer, the more B is available to be concentrated at the aluminide/substrate interface, and thus, the less boron is required to provide an effective diffusion barrier.

The boron and nickel can be admixed in any number of ways to provide the first coating layer. These ways include mixed deposition sources such as pressed powder targets for sputter deposition or mixed powders for spray deposition. These ways also include separate deposition sources which are used concurrently (or essentially concurrently such as a rapid switching between separate sources). A particularly preferred method is electroless deposition of Ni+B because such aqueous coating techniques are low-cost ways of achieving very uniform coatings on complex parts.

In the best mode contemplated for the use of this invention for oxidation protection applications, the Ni+B coatings are deposited on titanium alloy substrates as the first coating step of a duplex coating process. A second coating composed primarily of Al is then deposited on top of the Ni+B layer, followed by annealing. This results in a NiAl-type outer coating and a boron-enriched layer of Ni at the coating/substrate interface. For such applications involving Ti alloy substrates, an additional, higher temperature annealing step will result in a layer of $TiB_2$ at the coating/substrate interface with TiB rod-like needles extending from the $TiB_2$ into the substrate.

The composition of the Ti substrates may include, for example, commercial purity Ti, gamma Ti (TiAl), super-alpha-2, Ti-6Al-4V and others. Ti-6Al-4V substrates give rise to particularly good results and, since it is the most commonly used Ti alloy, such substrates are preferred.

The layer of Ni+B may be deposited to any depth desired for adequate Ni-Al stoichiometry given the required amount of Al which is set by the particular application (the anticipated use environment). The diffusion of Al into the Ni+B layer may be accomplished by annealing after depositing the second, Al-enriched, coating or by simultaneously heating and depositing such as dip coating. The temperature of annealing is known from conventional duplex coating operations and ranges from, for example, about 550° C. to 660° C. but preferably about 630° C., for the first annealing step. This temperature would be substantially high (greater than 660° C.) for dip coating in molten Al. Should the additional annealing step be desired (for the formation of $TiB_2$ in applications involving Ti substrates), the annealing temperature would range from 800° C. to 1100° C. but chosen such that it would not compromise the microstructure of the particular substrate alloy.

The complex intermetallic Ti, Ni and Al phases at the coating/substrate interface, which are evident with pure Ni coatings (without an effective amount of boron) are completely absent. Bond strengths can be varied for a particular application by varying the amount of boron and/or by annealing to form $TiB_2$. It is anticipated that extremely high bond strength is achieved by the interpenetrating TiB rod-like features when the high-temperature annealing step is employed with Ti alloys.

It is to be understood that the Al and Ni+B layers may contain other components such as Cr or yttrium where desired.

The process of the present invention can also be applied to bonding Al-enriched materials to Ti-alloy-based materials wherein a diffusion barrier is again required to prevent the deleterious formation of intermetallic compounds. For example, the pressure infiltration of a double-walled titanium structure with a molten, Al-rich material is anticipated as a means to form a part which includes an aluminum metal matrix composite. In this example, the Ti surfaces are first coated with a Ni+B layer and the subsequent coating and annealing steps are carried out simultaneously upon contact with molten Al.

Additionally, where two separate metal substrates are sought to be bonded together, the present invention may be applied by sandwiching a layer of Al between Ni+B layers in order to protect the parts from Al diffusion. The thermally diffused aluminum may therefore be derived from aluminum-containing or aluminum-coated parts, thermally bonded to Ni+B coated parts.

The process of the present invention can also be applied to other metal substrates where it is desirable to inhibit diffusion, including, for example, nickel-based alloys. It is noted that although U.S. Pat. No. 4,055,706 calls for elimination of boron prior to aluminization, we have surprisingly found quite the reverse.

The process of the present invention is also advantageous in coating fibers.

EXAMPLE 1

A mixture of nickel (Ni) and boron having 4% boron by weight was formed by using a pressed powder sputter target. The mixture was coated onto a βB21STi alloy substrate to a depth of 7.6 micrometers using sputter deposition. Then, aluminum (Al) was deposited onto the nickel-boron coating to a depth of 17.8 micrometers, using sputter deposition, thus forming a duplex coating. The sample was annealed at 630° C. for two minutes in a tube furnace with flowing argon which had undergone repeated evacuation and argon-purging cycles.

Figure 1:
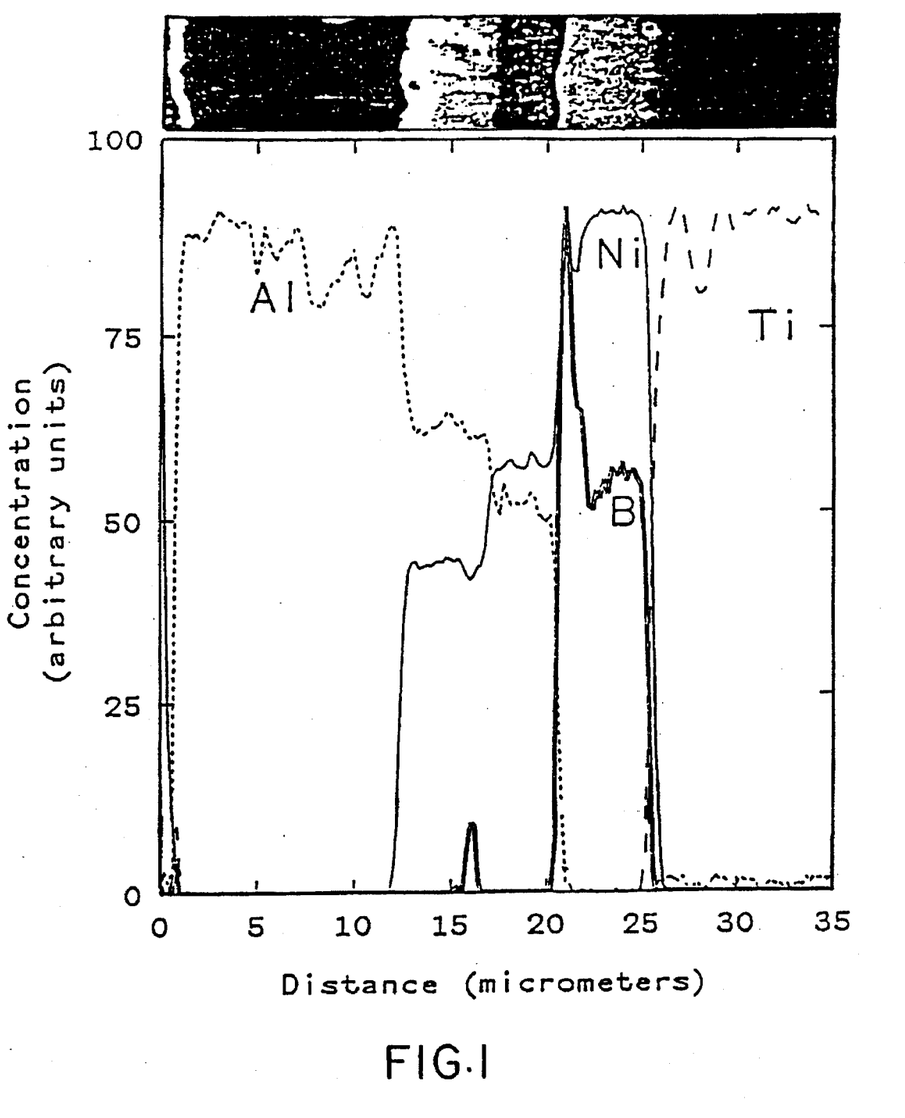
FIG. 1 is an Auger electron spectioscopy (AES) line scan showing the boron distribution of a β21-S Ti alloy coated in accordance with the invention but before the NiAl completely forms.

FIG. 1 shows a scanning electron microscopy (SEE) photomicrograph alongside an associated Auger electron spectroscopy (AES) line scan for the sample. It can be seen that boron becomes concentrated at the surface side of the remnant Ni layer prior to completely annealing the Ni and Al. AES as well as energy dispersive x-ray spectroscopy or EDXS (not shown) reveal that in addition to the Al and Ni+B layers there are intervening layers of $NiAl_3$ and $Ni+_2Al_3$. Boron does not interdiffuse with the aluminum and, even at this low temperature, we have found that boron begins to block diffusion pathways between the coating (Al and Ni) and the titanium alloy substrate.

EXAMPLE 2

Figure 2:
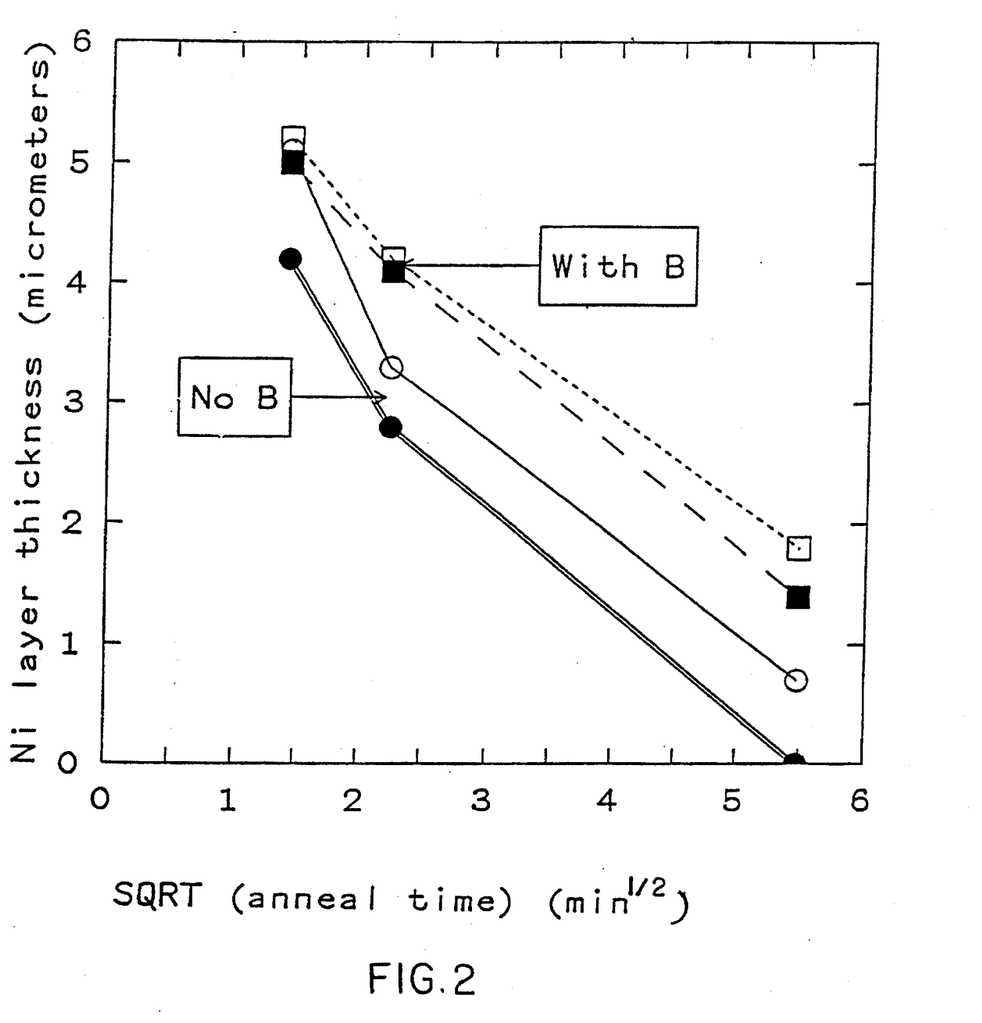
FIG. 2 is a chart of Ni layer thickness plotted against annealing time.

A sample such as the one prepared in Example 1 was compared with an identical sample except lacking boron. Thicknesses of the Ni+B layer and the Ni layer in the respective samples were compared as a function of 630° C. annealing time. FIG. 2 clearly demonstrates that diffusion is hindered by the presence of boron. Layer evolution was slower when boron was present.

EXAMPLE 3

Figure 3A:
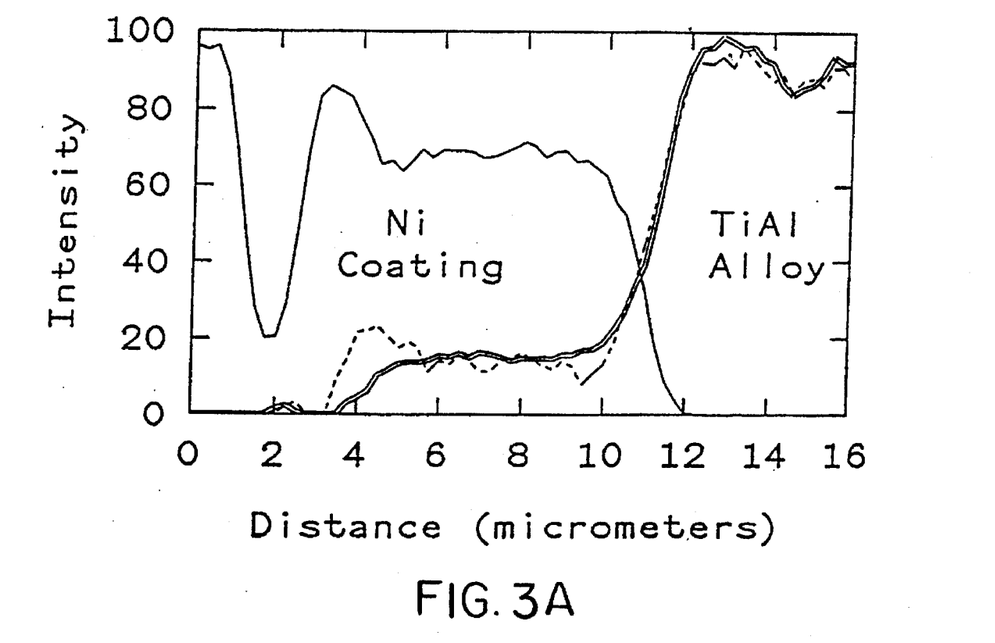
FIG. 3A is an AES line scan of Ni, Ti, Al, and B intensity plotted against specimen depth.
Figure 3B:
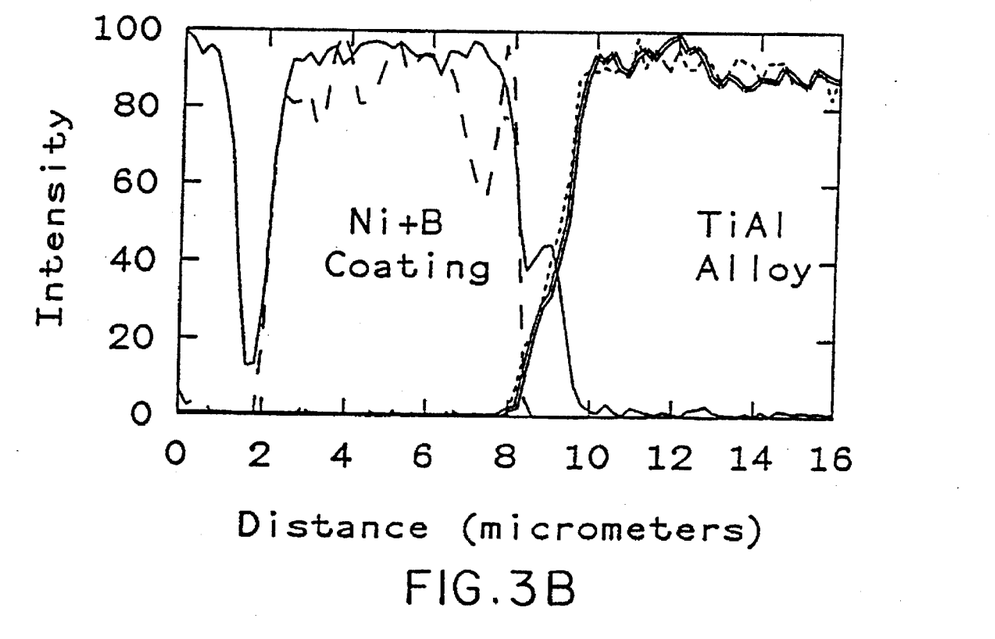
FIG. 3B is an AES line scan like 3A but on a specimen without boron.

Gamma-titanium substrates were coated with Ni+4 wt. % boron and compared to identical substrates coated with Ni, but no boron. Each was annealed for 6 hours at 700° C. AES and EDXS measurements were taken and resulted in a showing that, after 6 hours of annealing, the Ni layer, without boron, had been largely converted to $Ni_3(TiAl)$. See FIGS. 3A and 3B. In contrast, the Ni+B layer was largely intact. Also, since boron and nickel have nearly identical spatial distributions, when there was no aluminum to diffuse, it was concluded that the boron movement during the aluminization step in Examples 1 and 2 was unrelated to any interaction with titanium and therefore the boron movement could be achieved when diffusing Al through Ni+B on substrates other than titanium.

EXAMPLE 4

Figure 4:
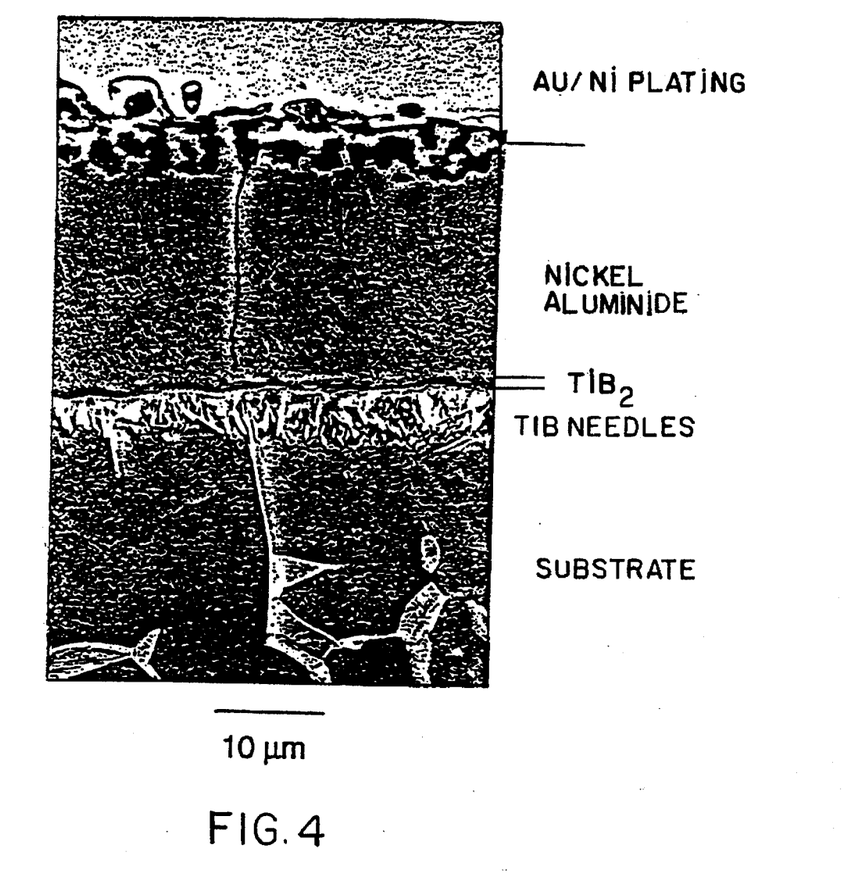
FIG. 4 is a secondary electron microscopy (SEM) microsection of a coated Ti-6Al-4V specimen using boron in the Ni layer.

A Ti-6Al-4V substrate is coated with 7.6 micrometers of nickel having 4 wt. % boron. Al is then coated thereover to a depth of 17.4 micrometers after which the duplex coating is annealed for 24 hours at 630° C. The duplex coated substrate is then annealed cyclically in dry air at 816° C. for 100 hours. FIG. 4 is a photomicrograph of the interfacial region between the nickel aluminide layer and the Ti-6Al-4V substrate. AES analysis indicted that there was no detectable boron in the nickel aluminide layer, that there was no longer any remnant Ni+B layer, and that there was a $TiB_2$ layer at the interface. Also TiB rod-like features extended from the interface into the Ti alloy.

EXAMPLE 5

Figure 5:
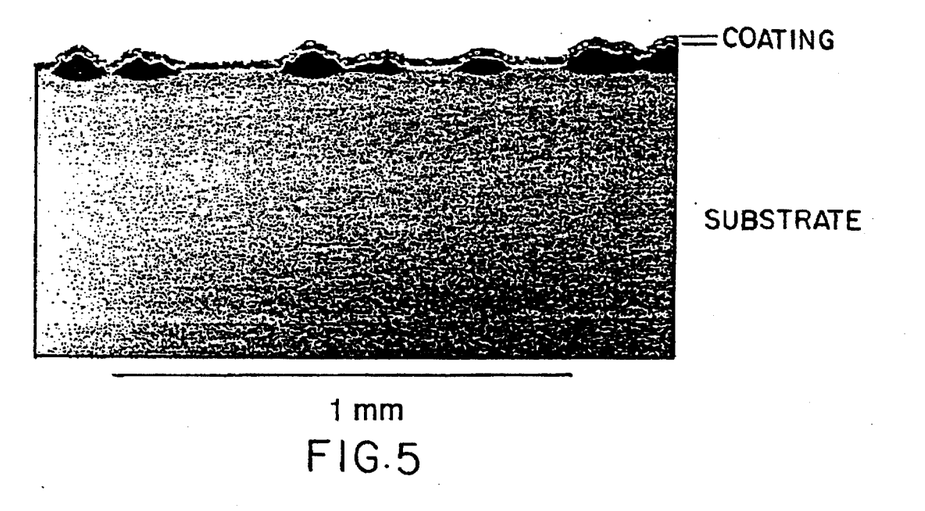
FIG. 5 is an SEM microsection of a NiAl coating on a super-alpha-2 substrate oxidized for 50 hours in air at 816° C.

Super alpha-2 (i.e., Ti-25 Al-10Nb-3V-1Mo) alloy was duplex coated and low-temperature annealed as in Example 4 but then annealed in dry air at 810° C. for 50 hours. An SEM photomicrograph shown in FIG. 5 illustrates some regions in which diffusion of Al led to the formation of substantial regions composed of $TiAl_3$. Although there occurred some leaks in the boride diffusion layer, surprisingly, no cracks were observed (by use of the SEM) despite the strains which might have been expected to accompany such rough, reacted coatings.

EXAMPLE 6

Figure 6A:
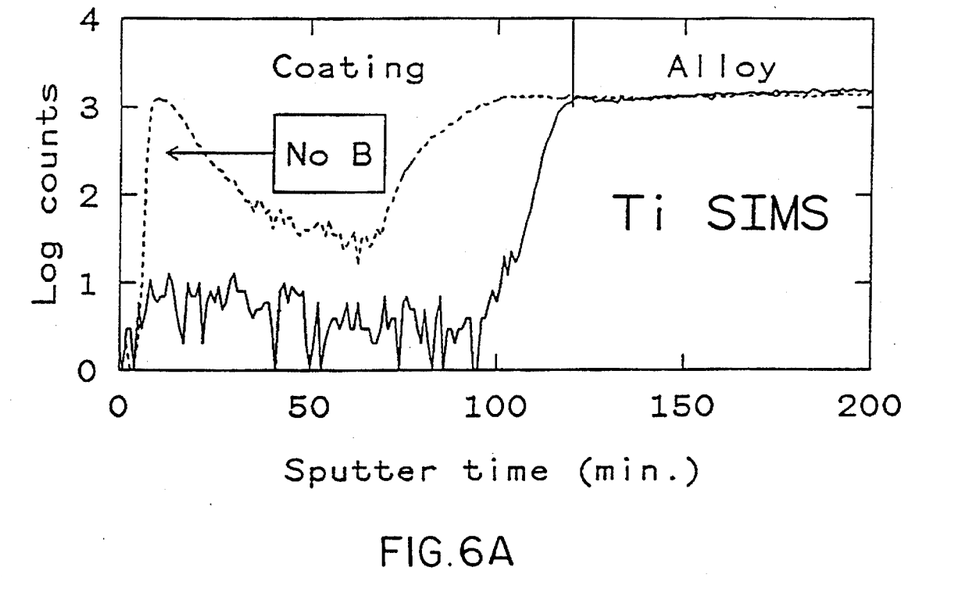
FIGS. 6A and 6B are secondary ion mass spectioscopy (SIMS) depth profiles of Ti and vanadium, respectively, in a NiAl coating on Ti-6Al-4V substrates with and without boron in the Ni layer.
Figure 6B:
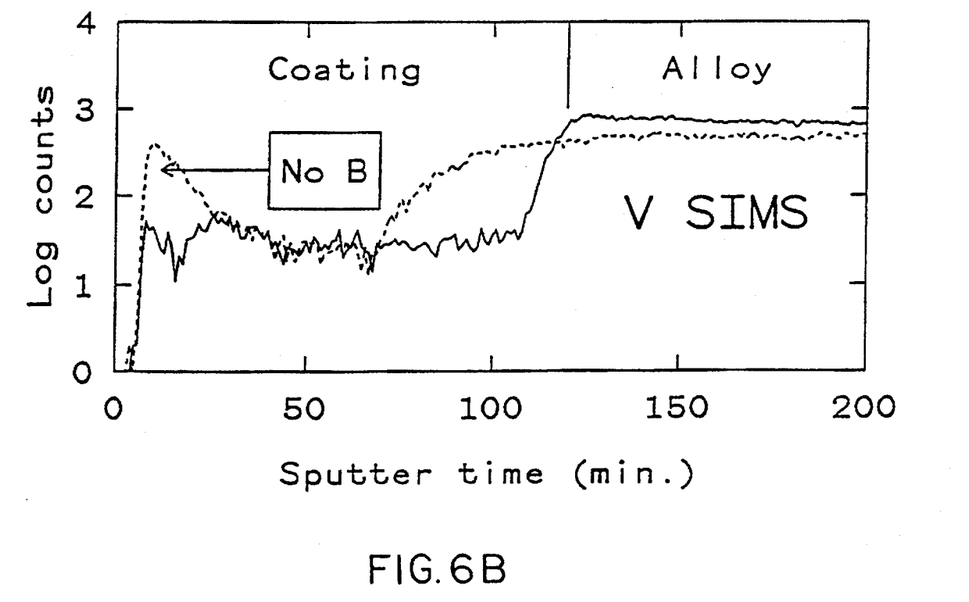

Secondary ion mass spectroscopy depth profiles (FIG. 6) were obtained from two Ti-6Al-4V substrates after duplex coating of nickel and aluminum, one specimen with boron and the other without, prepared as described in Example 4. Both were subjected to 816° C. annealing in dry air for 100 hours. Diffusion of vanadium and especially titanium into the nickel aluminide were demonstrated to be greatly hindered due to the effect of boron.

The increase in intensity of the Ti and V signals near the surface of the oxidized specimen is due, at least in part, to the increased concentration of oxygen which enhances the ionization probability of electropositive elements. Experimentally, it could not be determined if the apparent V signal (mass 51) in the nickel aluminide layer was from V or whether, at that point, there was some interfering molecule of the same mass. Since both specimens were similarly oxidized, the fact that there is no surface-enhanced V signal for the specimen fabricated with B strongly suggests that the V level in that specimen is lower than that indicated by the SIMS results.

EXAMPLE 7

Duplex coatings were conducted by applying a Ni layer and then an Al layer on super-alpha-2 Ti specimens as described in Example 4. Some of the specimens were coated with, and some without, the use of boron (B) in the Ni layer.

Figure 7A:
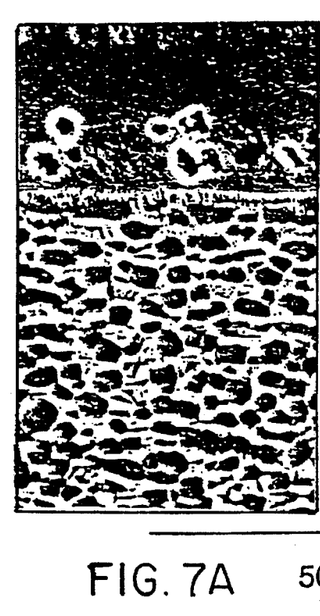
FIGS. 7A (with boron) and 7B (without boron) are SEM microsections from NiAl-coated super-alpha-2 Ti-alloy substrates.
Figure 7B:
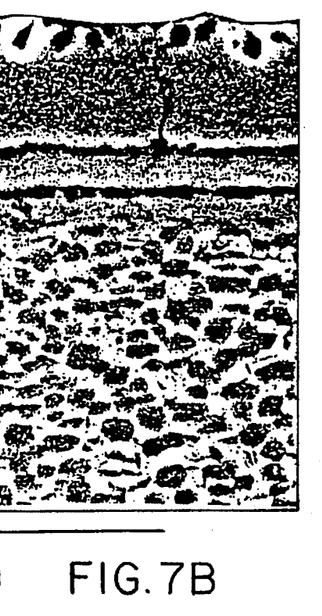

SEM photomicrographs of representative specimens in FIG. 7A (with boron) and FIG. 7B (without boron) are shown. In 7B, there are complex interaction zones due to the interdiffusion of the constituent materials; i.e., Ti, Ni and Al. These zones are completely absent in 7A. The protective NiAl layer of 7B is thinner than 7A because of the formation of multilayered reaction zones when B is not used. Use of boron decreases the overall thickness of NiAl needed to obtain an equivalent amount of protective nickel aluminum.

EXAMPLE 8

Duplex coatings were conducted by applying a Ni layer and then an Al layer on several specimens of Ti-6Al-4V as described in Example 4. Some of the specimens were coated with, and some without, boron (B) in the Ni layer.

Figure 8A:
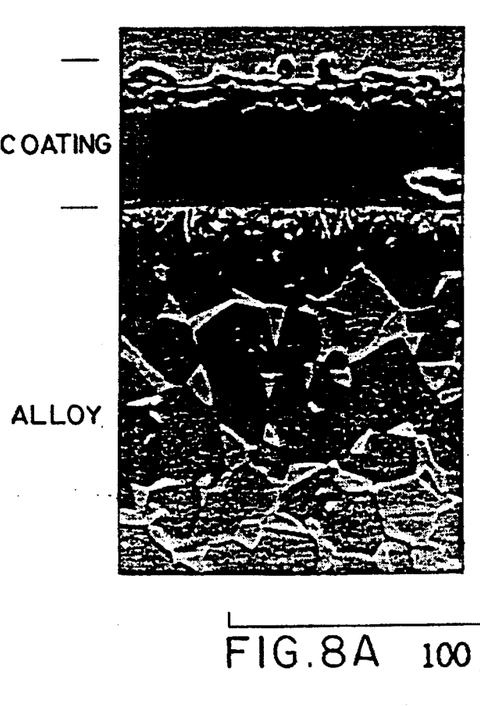
FIGS. 8A (with boron in Ni layer) and 8B (without boron) are SEM microsections of NiAl-coated Ti-6Al-4V substrates.
Figure 8B:
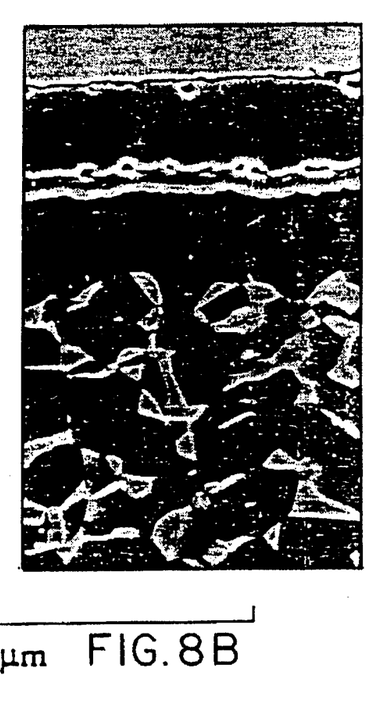

FIGS. 8A (with boron) and 8B (without boron) are SEM photomicrographs. FIG. 8A shows (more readily than in 7A) a region which includes the rod-like features separating the coating and the substrate. Auger electron spectroscopy confirmed that these rodlike features are composed of TiB. FIG. 8B shows complex interaction zones due to the interdiffusion of Ti, Ni and Al, which does not occur in 8A when boron was used.

EXAMPLE 9

Figure 9A:
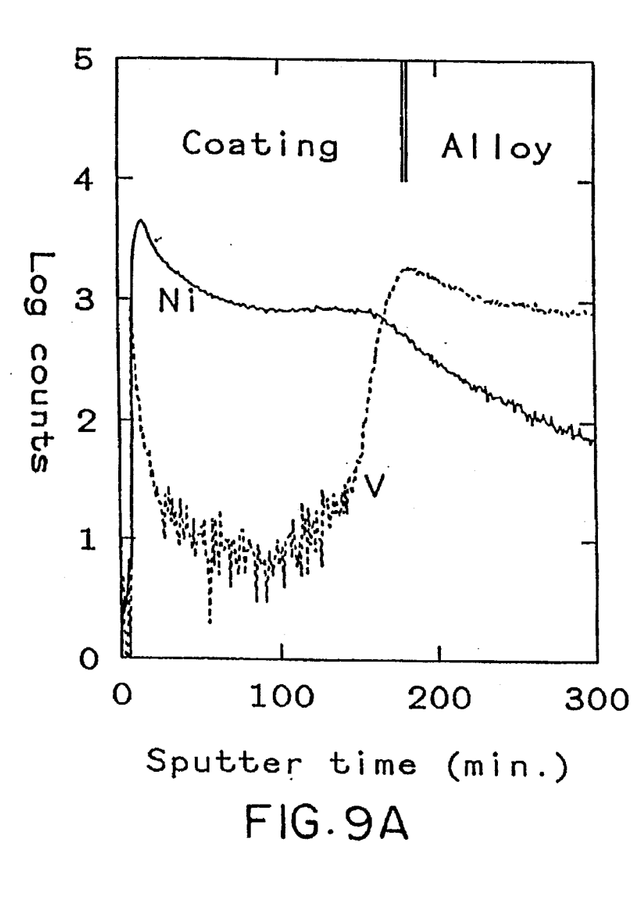
FIGS. 9A (with boron in the Ni layer) and 9B (without boron) are SIMS depth profiles of NiAl-coated super-alpha-2 alloy specimens after oxidizing in air for 50 hours at 816° C.
Figure 9B:
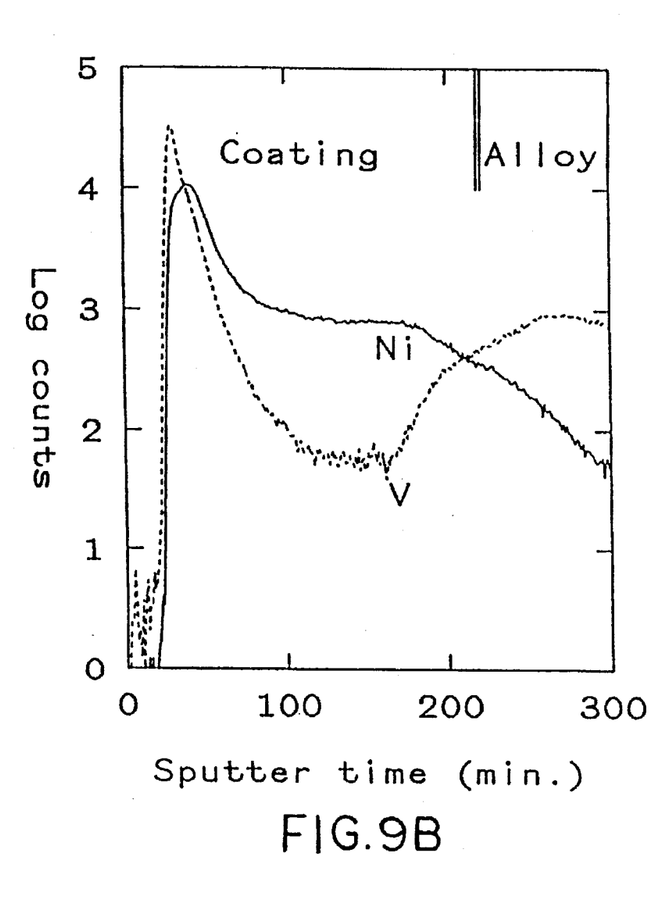

Specimens from Example 7 were oxidized in air for 50 hours at 816° C., and secondary ion mass spectra from those specimens with boron (FIG. 9A) were compared with those specimens (FIG. 9B) without boron in the Ni layer. As was the case in Example 6, it can be readily seen that when boron is contained in the Ni layer, the diffusion of vanadium out of the Ti alloy and into the coating is inhibited.

EXAMPLE 10

Figure 10A:
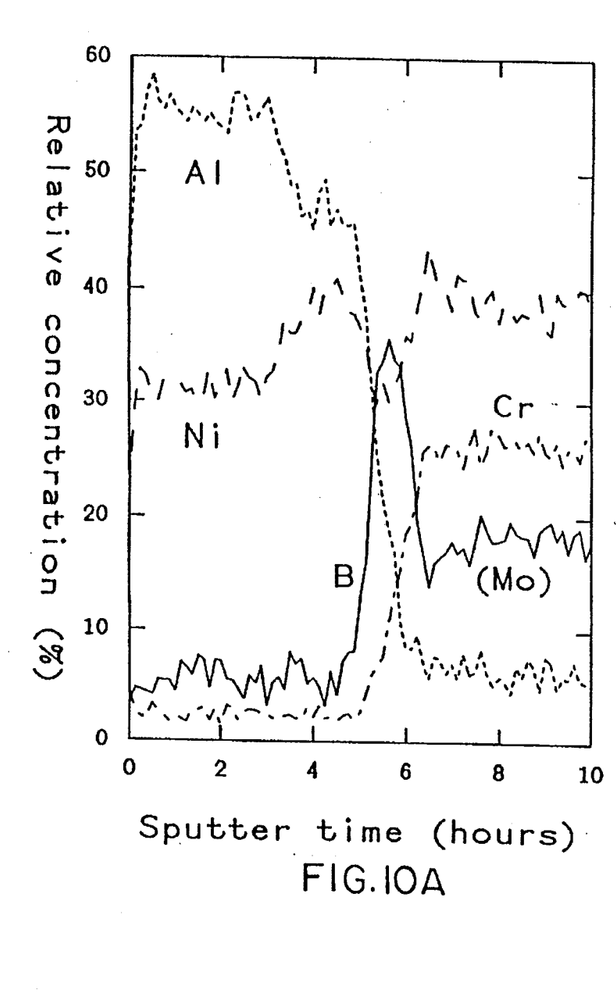
FIGS. 10A (with boron in the Ni layer) and 10B (without boron) are AES depth profiles on NiAl-coated Inconel specimens.
Figure 10B:
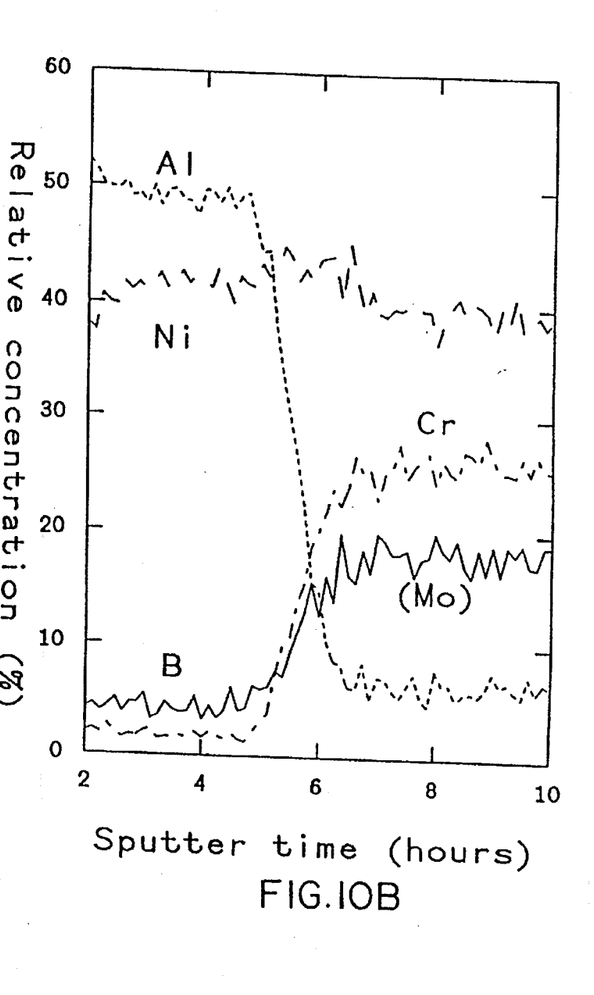

Two identical substrates of Inconel (atomic conc. of Ni 55%, Cr. 24%, Nb 3%, Mo 2% and Fe 16%) were coated with Al/Ni+B (10A) and Al/Ni (10B). The specimens were then annealed at 630° C. Auger electron spectroscopy depth profiles were taken. Profile 10A, containing boron, shows boron moves to the interface between the nickel aluminide and the Inconel. Although it might appear from this profile that boron diffused into the substrate, that is not the case. Rather, there is an interfering signal from Mo which is one of the constituents of the substrate. These measurements, as those in Examples 1 and 3, show that boron becomes concentrated in the Ni layer (and thus acts as a diffusion barrier) when applied to substrates other than those composed of titanium.

What is claimed is:

1. An improved method for protecting metal substrates against inward diffusion from NiAl coatings and against outward diffusion of substrate impurities into the NiAl coatings, provided by the duplex coating of aluminum/boron-enriched nickel onto such metal substrates, the improvement comprising:

a. coating the metal substrate with a first coating layer of boron-enriched-nickel, the boron and nickel having nearly identical spatial distribution, and forming a substrate/coating interface; and b. without a step for substantially eliminating the boron from said first coating layer, migrating the boron to the substrate/coating interface by applying a second outer coating layer, comprising aluminum, onto said first coating layer, and thermally diffusing said aluminum into the boron-enriched-nickel coating at from about 550° C. to about 800° C., wherein all of said thermal diffusing is conducted at about or below 800° C., thereby forming NiAl and concentrating the boron at the substrate/coating interface to provide an in situ barrier, at said interface, inhibiting outward diffusion of substrate metal and impurities and inhibiting inward diffusion of nickel and aluminum into the substrate at said interface;

whereby an improved NiAl oxidation protective layer is provided without having to substantially eliminate the boron, and an improved diffusion barrier is formed without a need for either an outflow of carbon or forming boron carbide or boroncarbonitride, and negating a need for substituting chromium to compensate for aluminum loss into the substrate.

2. The method of claim 1 wherein the thermally diffused aluminum is derived by thermally bonding an aluminum-containing or an aluminum-coated part to the boron-enriched-nickel coated metal substrate.

3. The method of claim 1 wherein the metal substrate is selected from the group consisting of Ti metal substrates, Ti-based alloy substrates, and Ti-alloy-based metal matrix composite substrates.

4. The method of claim 1 wherein the metal substrate is Ti or Ti-based alloy.

5. The method of claim 4 wherein an additional annealing step ranging from 800° C. to 1100° C. is employed to obtain $TiB_2$ in the diffusion barrier.

6. The method of claim 1, wherein the aluminum/boron-enriched nickel coating forms an oxidation protection coating.

7. The method of claim 1 wherein step (b) is conducted at 550° C.–660° C.

* * * * *

UNITED STATES PATENT AND TRADEMARK OFFICE
CERTIFICATE OF CORRECTION

PATENT NO. : 5,660,886
DATED : August 26, 1997
INVENTOR(S) : Douglas J. Peterman, Joan E. Deffeyes, and James E. O'Neal It is certified that error appears in the above-identified patent and that said Letters Patent is hereby corrected as shown below:

On the title page, item [73], should read

Assignee: McDonnell Douglas Corp.,

St. Louis, MO

Signed and Sealed this

Twenty-first Day of July, 1998

*Attest:*

BRUCE LEHMAN

*Attesting Officer*     *Commissioner of Patents and Trademarks*